US012760163B2

(12) United States Patent
Liao et al.

(10) Patent No.: US 12,760,163 B2
(45) Date of Patent: Oct. 13, 2026

(54) DISPOSAL METHOD FOR POLYESTER-CONTAINING RELEASE FILM AND MANUFACTURING METHOD OF POLYESTER-CONTAINING OBJECT

(71) Applicant: NAN YA PLASTICS CORPORATION, Taipei (TW)

(72) Inventors: Te-Chao Liao, Taipei (TW); Chao-Quan Wu, Taipei (TW); Ching-Yao Yuan, Taipei (TW)

(73) Assignee: NAN YA PLASTICS CORPORATION, Taiepi (TW)

( * ) Notice: Subject to any disclaimer, the term of this patent is extended or adjusted under 35 U.S.C. 154(b) by 611 days.

(21) Appl. No.: 18/354,678

(22) Filed: Jul. 19, 2023

(65) Prior Publication Data

US 2024/0400783 A1 Dec. 5, 2024

(30) Foreign Application Priority Data

Jun. 2, 2023 (TW) ................................ 112120611

(51) Int. Cl.
*C08J 11/08* (2006.01)

(52) U.S. Cl.
CPC ............ *C08J 11/08* (2013.01); *C08J 2367/00* (2013.01); *C08J 2367/02* (2013.01)

(58) Field of Classification Search
CPC ..... B32B 43/006; B32B 27/08; B32B 27/283; B32B 27/36; B32B 7/06; B29B 17/02; B29B 2017/0289; Y02W 30/62
See application file for complete search history.

(56) References Cited

U.S. PATENT DOCUMENTS

2005/0118443 A1* 6/2005 Lee .......................... C08J 7/046 428/447

FOREIGN PATENT DOCUMENTS

| | | | | |
|---|---|---|---|---|
| JP | S4963768 | | 6/1974 | |
| JP | 2001310970 | | 11/2001 | |
| JP | 2002501810 | | 1/2002 | |
| JP | 2013521154 | | 6/2013 | |
| JP | 2020090094 | | 6/2020 | |
| JP | 2021160350 | | 10/2021 | |
| JP | 2021187870 | A * | 12/2021 | |
| JP | 2022031256 | | 2/2022 | |
| JP | 2022151302 | | 10/2022 | |
| KR | 20130121387 | A * | 11/2013 | .............. C08J 11/06 |
| TW | 202200335 | | 1/2022 | |

OTHER PUBLICATIONS

Machine Translation of KR2013-0121387A. Nov. 6, 2013. (Year: 2013).*
Machine Translation of JP2021-187870A. Dec. 13, 2021 (Year: 2021).*
"Office Action of Taiwan Counterpart Application", issued on Feb. 26, 2024, p. 1-p. 6.
"Office Action of Japan Counterpart Application", issued on Nov. 25, 2024, p. 1-p. 4.

* cited by examiner

*Primary Examiner* — Stephen E Rieth
(74) *Attorney, Agent, or Firm* — JCIPRNET

(57) ABSTRACT

A disposal method for a polyester-containing release film including the following steps is provided: providing a release film, which includes a base material and a release layer, wherein at least a material of the base includes polyester, and providing an acid washing step or an alkali washing step to the release film for removing the release layer, and to obtain a polyester-containing solid material.

7 Claims, 2 Drawing Sheets

DISPOSAL METHOD FOR POLYESTER-CONTAINING RELEASE FILM AND MANUFACTURING METHOD OF POLYESTER-CONTAINING OBJECT

CROSS-REFERENCE TO RELATED APPLICATION

This application claims the priority benefit of Taiwan application serial no. 112120611, filed on Jun. 2, 2023. The entirety of the above-mentioned patent application is hereby incorporated by reference herein and made a part of this specification.

BACKGROUND

Technical Field

The disclosure relates to a disposal method for release film and a method for manufacturing an object, and particularly relates to a disposal method for release film containing polyester and a method for manufacturing a polyester-containing object.

Description of Related Art

A release film is widely used in life or manufacturing. A commercially available release film includes a corresponding substrate and a release layer disposed thereon. The release layer could adhere to an object, and after an appropriate use, the object could be separated from the release layer. In general, the used release film is usually discarded as general waste and disposed of by incineration or landfill.

In 1990, the United Nations Environment Programme (UNEP) proposed the concept of "Cleaner Production (CP)" for reducing pollutants or waste in the product manufacturing process, or achieving reasonable resource utilization through energy-saving or material-saving in the product manufacturing process. Moreover, Directive (EU) 2019/904 of the European Parliament and of the Council is to prevent and reduce the impact of certain plastic products on the environment. As such, finding a possible and efficient solution for recycling and reusing material has become a current research topic.

SUMMARY

The disclosure relates to a disposal method for a polyester-containing release film and a manufacturing method of a polyester-containing object.

A disposal method for a polyester-containing release film of the disclosure includes the following steps: providing a release film comprising a substrate and a release layer, wherein at least a material of the substrate comprises polyester; and performing an acid washing step or an alkali washing step to the release film for removing the release layer and obtaining a solid matter containing polyester.

A manufacturing method of a polyester-containing object of the disclosure includes the step of using a recycled and reproduced polyester obtained or produced by the aforementioned disposal method for a polyester-containing release film.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description, for the sake of illustration and not limitation, exemplary embodiments revealing specific details are set forth to provide a thorough understanding of various principles of the disclosure. However, it will be obvious to those skilled in the art that the disclosure may be practiced in other embodiments that depart from the specific details disclosed herein. In addition, descriptions of well-known devices, methods, and materials may be omitted so as not to obscure the description of various principles of the disclosure.

A range may be expressed herein as from "about" a specific value to "about" another specific value, and it may also be directly expressed as a specific value and/or to another specific value. When expressing such range, another embodiment includes from the one specific value and/or to another specific value. Similarly, when a value is expressed as an approximation by using the antecedent "about", it will be understood that the specific value forms another embodiment. It will be further understood that the endpoint of each range is obviously related to or independent of the other endpoint.

In this article, non-limiting terms (such may, could, can, for example, or other similar terms) are unnecessary or optional implementations, inclusions, additions or existences.

Unless otherwise defined, all terms (including technical terms and scientific terms) used herein have the same meanings commonly understood by those with ordinary knowledge in the art. It will also be understood that terms (such as those defined in commonly used dictionaries) should be interpreted as having meaning consistent with the meaning in the relevant technical context, and should not be interpreted in an idealized or overly formal sense, unless clearly defined as such herein.

[Release Film]

Figure 1:
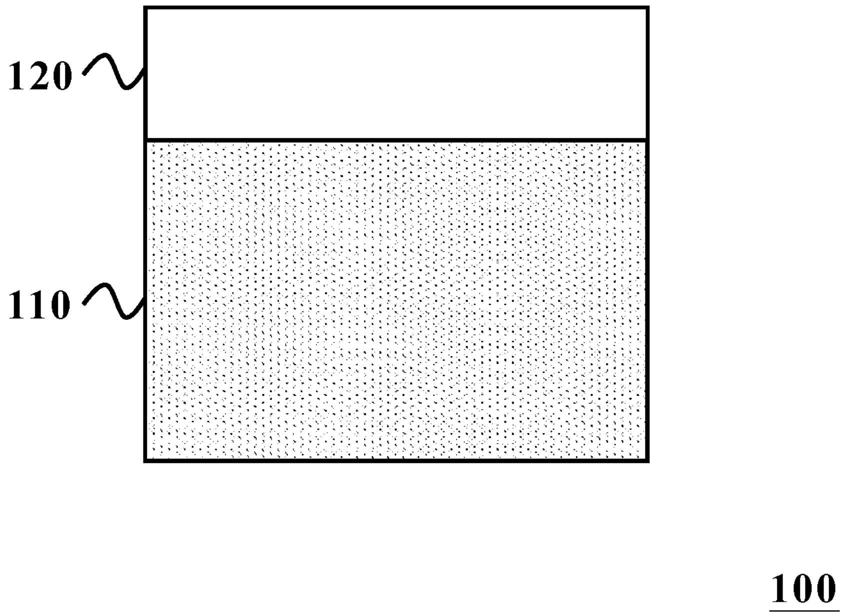
FIG. 1 is a schematic drawing of a release film according to an embodiment of the disclosure.

FIG. 1 is a cross-sectional schematic view of a release film according to an embodiment of the disclosure.

Referring to FIG. 1, the release film 100 includes a substrate 110 and a release layer 120. The release layer 120 is disposed on the substrate 110.

In an embodiment, the material of the substrate 110 may include polyester.

It should be noted that the term "polyester" used herein includes polymers generally referred to as polyesters, particularly referring to aromatic polyesters, and specifically refers to polyesters derived from purified terephthalic acid (PTA) and ethylene glycol (EG) (e.g., polyethylene terephthalate (PET)).

In addition, the polyester in the disclosure may also be, for example, polypropylene terephthalate, polybutylene terephthalate, polyethylene naphthalate, or a combination thereof. In an embodiment, the polyester is preferably polyethylene terephthalate, polypropylene terephthalate, or a combination thereof. Furthermore, copolymers may also be used, which specifically refers to copolymers obtainable by using two or more dicarboxylic acids and/or two or more diol components.

In an embodiment, the material of the substrate 110 does not include polyurethane (e.g., polyurethane resin or similar materials containing polyurethane) or polyacrylic acid/polyacrylate (e.g., acrylic resin, polymethyl methacrylate, or similar materials containing polyacrylic acid). When using a polyester substrate as the substrate, if the material of a substrate (its structure is similar to the substrate 110, but the material is different) includes polyurethane (PU) or polyacrylate, it may increase the difficulty or complexity of recycling.

In an embodiment, the release layer 120 may be formed by an aqueous release agent.

In an embodiment, the solubility of the aqueous release agent in water or aqueous solution (e.g., acidic aqueous solution, alkaline aqueous solution, or neutral aqueous solution) is greater than its solubility in lipophilic or hydrophobic organic solvents. If the aforementioned lipophilic or hydrophobic organic solvent is mixed with pure water under normal conditions (e.g., without any surfactants, without any reactants, without vigorous or prolonged shaking or stirring), there may be a corresponding interface (commonly referred to as an organic-aqueous interface) between the aforementioned lipophilic or hydrophobic organic solvent and pure water. The aforementioned lipophilic or hydrophobic organic solvent may include, but is not limited to, toluene, methyl isobutyl ketone (MIBK), hexane, methyl ethyl ketone (MEK), or a co-solvent including the above.

In an embodiment, the aqueous release agent may include hydrophilic silicone. Hydrophilic silicone may include a polymer main body as shown in the following [Formula 1].

Formula 1

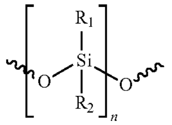

In [Formula 1], n is a positive integer between 5 and 200. Each $R_1$ could be the same or different. Each $R_2$ could be the same or different. $R_1$ and $R_2$ could be the same or different.

In an embodiment, $R_1$ or $R_2$ may include a hydrophilic side chain. The aforementioned hydrophilic side chain may include a functional group with amide bonds, phosphocholine functional groups, or hydroxyl groups, but the disclosure is not limited thereto.

In an embodiment, the end or terminal of [Formula 1] may include a hydroxyl group or other suitable hydrophilic groups, but the disclosure is not limited thereto. That is, [Formula 1] may include a terminal hydroxyl group or other suitable hydrophilic terminal groups.

In an embodiment, a manufacturing method of the release film 100 may include the following steps: providing a substrate 110; forming an aqueous release agent on the substrate by coating, film casting, or other suitable methods; and curing the aqueous release agent formed on the substrate by drying, standing, or other suitable methods to form a corresponding release layer (e.g., the cured aqueous release agent) 120. In an embodiment, the aforementioned manufacturing method may be performed by using common roll-to-roll manufacturing equipment, but the disclosure is not limited thereto. In an embodiment, a corresponding peelable layer could be laminated on the release layer 120, but the disclosure is not limited thereto.

In an embodiment, application steps of the release film 100 may include but is not limited to: applying the release layer 120 of the release film 100 to an appropriate location on an object with the release layer 120 facing the object to be laminated. Taking the manufacturing of multi-layer ceramic capacitors (MLCC) as an example, a ceramic sheet may be first laminated on the release film 100. The release film 100 may be used to support the ceramic sheet thereon and provide subsequent release effects, for facilitating the corresponding MLCC manufacturing process for the ceramic sheet laminated thereon. Additionally, after completing the aforementioned manufacturing process, the release film 100 would be peeled off.

In an embodiment, before applying the release layer 120 to an appropriate object, the peelable layer (if any) laminated thereon could be removed first.

[Treatment of a Used Release Film]

Compared to the release film (e.g., the same or similar to the aforementioned release film 100) before use, the release film after use (e.g., the used release film) may have a slight change in appearance or material. For example, the used release film may have a slight damage, a slight crease, and other possible usage traces in appearance; and/or, the used release film may have changes in the fine structure and/or material surface due to heating, ventilation, and exposure to light during a corresponding manufacturing process. However, the aforementioned changes basically do not affect the overall nature (e.g., the release layer composed of hydrophilic silicone and/or the substrate composed of polyester) and/or do not affect a treatment method described later. Therefore, for simplicity, the same terms are still used to represent a subsequent process. For example, the used release film may still be referred to as the release film, and the used release film still includes the corresponding substrate and release layer.

The release film after use could be treated with acid washing or alkali washing for removing the release layer on the substrate.

In an embodiment, before performing the aforementioned acid washing or alkali washing, the used release film may be reduced in size by a quick or simple physical method (e.g., cutting, trimming, slicing, or chopping, but not limited to these).

In an embodiment, the used release film may be immersed in an alkali solution to remove the release layer on the substrate. In an embodiment, the alkali solution may be, for example, about 7 wt % to 13 wt % sodium hydroxide aqueous solution ($NaOH_{(aq)}$) or an alkaline aqueous solution with the same alkali equivalent. In an embodiment, the alkali solution may be, for example, about 10 wt % sodium hydroxide aqueous solution or an alkaline aqueous solution with the same alkali equivalent. In an embodiment, the alkali solution may be an alkaline aqueous solution with the same alkali equivalent or hydroxyl ion equivalent as the aforementioned sodium hydroxide aqueous solution.

In an embodiment, during the process of immersing the used release film in the alkali solution, appropriate heating may be performed. In an embodiment, the temperature may be raised to about 50° C. to 70° C. In an embodiment, the temperature may be raised to about 60° C.

In an embodiment, the temperature may be raised to about 50° C. to 70° C. for about 0.5 hours to 2 hours. In an embodiment, the temperature may be raised to about 60° C. for about 0.5 hours to 2 hours.

In an embodiment, the aforementioned alkali washing method may cause a corresponding chain cleavage reaction between silicon and oxygen in the corresponding material (e.g., silicone) of the release layer. In an embodiment, the residues generated after the chain cleavage reaction by the aforementioned alkali washing may further undergo a corresponding depolymerization by backbiting reaction, and to form a silicon-oxide compound that may be suitable for being removed by water washing.

In an embodiment, a substrate containing polyester is essentially insoluble (e.g., the mass percent of solute is less than or equal to about 100 ppm) in the alkali solution used for alkali washing.

In an embodiment, the used release film may be immersed in an acidic solution to remove the release layer on the substrate. In an embodiment, the acidic solution may be, for example, an acidic oil solution of dodecylbenzenesulfonic acid and paraffin oil, wherein the weight ratio of dodecylbenzenesulfonic acid to paraffin oil is about 20:80 to 30:70. In an embodiment, the acidic solution may be, for example, an acidic oil solution of dodecylbenzenesulfonic acid and paraffin oil, wherein the weight ratio of dodecylbenzenesulfonic acid to paraffin oil is about 25:75. In an embodiment, the acidic solution may be an acidic oil solution with the same acid equivalent or hydrogen ion equivalent as the aforementioned mixture containing dodecylbenzenesulfonic acid and paraffin oil.

In an embodiment, the aforementioned acid washing method may cause a corresponding chain cleavage reaction between silicon and oxygen in the corresponding material (e.g., silicone) of the release layer. In an embodiment, the residues generated after the chain cleavage reaction by the aforementioned acid washing may further undergo a corresponding depolymerization by backbiting reaction, and to form a silicon-oxide compound that may be suitable for being removed by water washing.

In an embodiment, a substrate containing polyester is essentially insoluble (e.g., the mass percent of solute is less than or equal to about 100 ppm) in the acidic solution used for acid washing.

In an embodiment, the silicon-oxide compound, which are suitable for being removed by water washing, formed by the corresponding depolymerization by backbiting reaction may have a chemical formula as shown in the following [Formula 2].

[Formula 2]

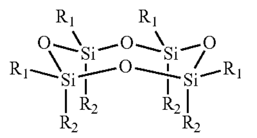

The definitions for $R_1$ and $R_2$ in [Formula 1] and [Formula 2] are the same or similar.

In an embodiment, after the aforementioned acid washing or alkali washing, most of the original release layer on the substrate may be essentially removed. In an embodiment, for example, the removal rate of the release layer could be estimated and/or calculated by comparing the weights before and after the aforementioned acid washing and/or alkali washing. The removal rate of the release layer may be about 95% or more.

In an embodiment, the used release film may be treated with acid washing and alkali washing to remove the release layer on the substrate. Moreover, acid washing and alkali washing are not performed simultaneously. That is, acid washing and alkali washing are sequentially performed in any order.

For example, in an embodiment, acid washing may be performed with an acidic oil solution first; then, the solid matter after acid washing (which may be referred to as a first solid matter in this embodiment) may be separated by an appropriate method (e.g., filtration through a mesh screen, but not limited to); then, the solid matter after acid washing (e.g., the first solid matter in this embodiment) may be optionally rinsed with water (e.g., pure water, reverse osmosis water (RO water), or deionized water (DI water)); then, the solid matter after acid washing (e.g., the first solid matter in this embodiment) may be treated with an alkaline aqueous solution for alkali washing; then, the solid matter after alkali washing (which may be referred to as a second solid matter in this embodiment) may be separated by an appropriate method (e.g., filtration through a mesh screen, but not limited to); then, the solid matter after alkali washing (e.g., the second solid matter in this embodiment) may be optionally rinsed with water (e.g., pure water, reverse osmosis water (RO water), or deionized water (DI water)).

For example, in an alternative embodiment, alkali washing may be performed first with an alkaline aqueous solution first; then, the solid matter after alkali washing (which may be referred to as a first solid matter in this embodiment) may be separated by an appropriate method (e.g., filtration through a mesh screen, but not limited to); then, the solid matter after alkali washing (e.g., the first solid matter in this embodiment) may be rinsed with water (e.g., pure water, reverse osmosis water (RO water), or deionized water (DI water)); then, the solid matter after alkali washing (e.g., the first solid matter in this embodiment) may be treated with an acidic oil solution for acid washing; then, the solid matter after acid washing (which may be referred to as a second solid matter in this embodiment) may be separated by an appropriate method (e.g., filtration through a mesh screen, but not limited to); then, the solid matter after acid washing (e.g., the second solid matter in this embodiment) may be optionally rinsed with water (e.g., pure water, reverse osmosis water (RO water), or deionized water (DI water)).

In an embodiment, when comparing before and after the aforementioned acid washing and alkali washing, the removal rate of the release layer may be 98% or more; even 99% or more; or even close to 100%.

In an embodiment, after performing the aforementioned acid washing and/or alkali washing, the remaining solid matter essentially comprises a recycled polyester material (e.g., flake, granular, or powder forms of recycled polyester-containing substrate).

It should be noted that the term "solid matter" used in this disclosure is not limited to a complete or pure solid state. For example, the "solid matter" may include a flake, strip, powder, and/or granular solid; as well as liquid adhering to the solid or located between two solids due to capillary action. The "solid matter" may be dried by an appropriate method (e.g., heating and/or vacuum drying) to obtain a dried solid with almost no liquid. Based on the total weight of the "solid matter", the weight of the dried solid may be about 80% or more; preferably about 90% or more; and more preferably about 95% or more.

In an embodiment, the treatment process of the used release film essentially does not use one or more common volatile organic solvents. That is, the treatment process of the used release film is a "volatile organic solvent-free" treatment process. The volatile organic solvent is essentially an organic solvent or co-solvents containing one or more volatile organic compounds (VOCs). A common volatile organic solvent may include, but are not limited to: formaldehyde, methanol, formic acid, toluene, methyl isobutyl ketone (MIBK), dichloromethane (DCM), trichloroethylene, acetonitrile (ACN), ethyl acetate (EA), hexane, acetone (DMK), isopropanol (IPA), methyl ethyl ketone (MEK), dimethylacetamide (DMAC), dimethylformamide (DMF), propylene glycol monomethyl ether (PM), ethyl ether, butanol, methyl tert-butyl ether (MTBE), chloroform, or co-solvents thereabove. Therefore, the treatment may be relatively simple (e.g., easier to comply with relevant regulations) and/or environmentally friendly (eco-friendly).

[Polyester Recycling]

Recycled polyester materials may essentially be recycled and reused (e.g., polyester granulation, but not limited to) through an appropriate method. A reuse method may include, but is not limited to: a manufacturing uses for a textile, a container, a sheet, a packaging material, a film, and other polyester-containing items. For example, the recycled polyester may be appropriately reprocessed to produce a substrate (e.g., the same or similar to the aforementioned substrate) suitable for a release film (e.g., the same or similar to the aforementioned release film).

The treatment method for recycling polyester include a physical reproducing process or a chemical reproducing process. The physical reproducing process include using an extruder to melt the treated polyester and then extrude and cut it into a chip. The chemical reproducing process may include using a chemical depolymerization solution to depolymerize the recycled polyester, and then re-polymerizing the obtained monomers and/or oligomers under specific conditions, followed by granulation; the chemical depolymerization solution may be water, methanol, ethanol, ethylene glycol, diethylene glycol, or any combination thereof.

In an embodiment, the recycling rate of polyester may be greater than or equal to 90% as determined by weighing. In an experimental example, the recycling rate of polyester could be greater than or equal to 92.4%.

[A Manufacturing Process of a Release Film Containing Polyester or a Treatment Process for a Release Film Containing Polyester after being Used]

Figure 2:
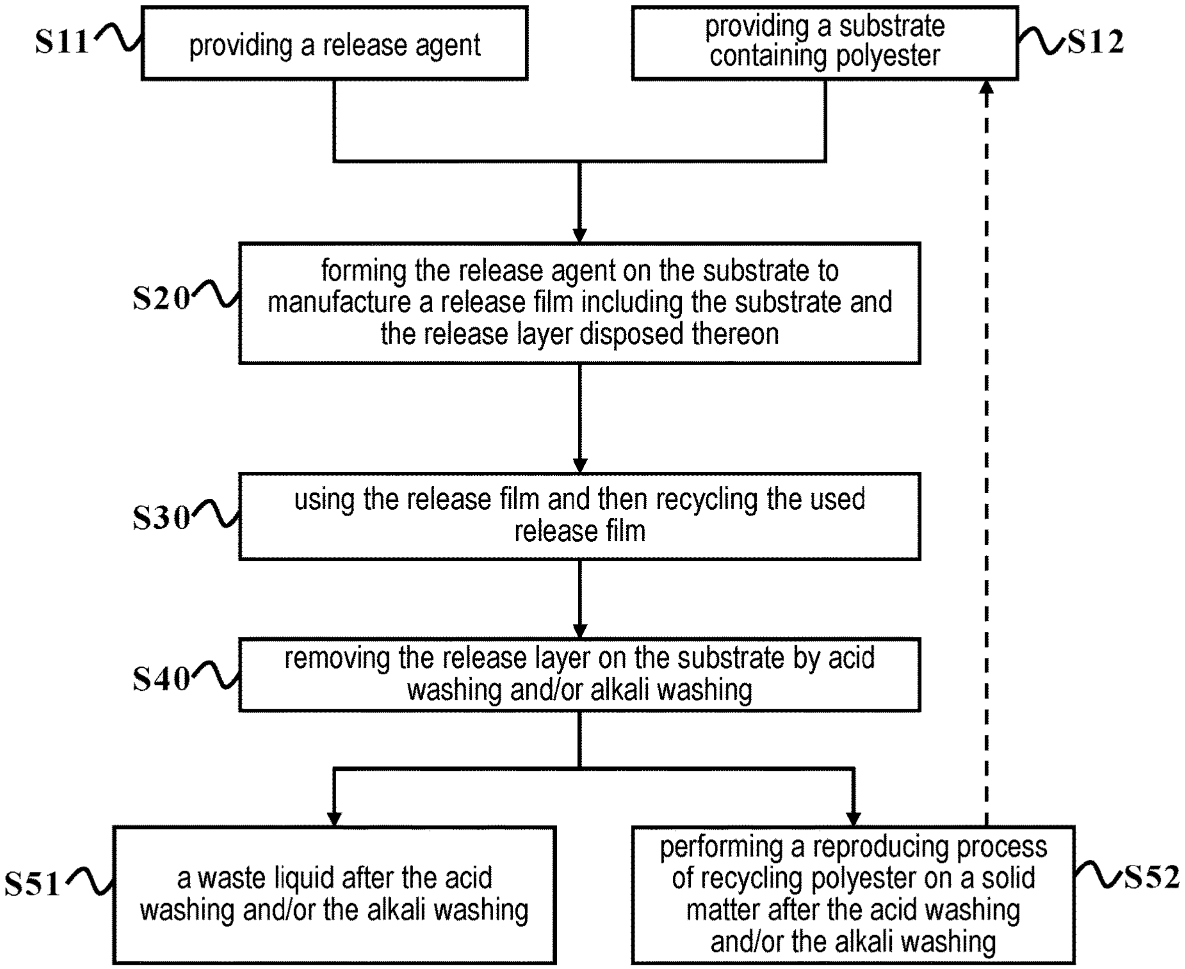
FIG. 2 is a schematic flow chart of a treatment process for a release film containing polyester after being used or a manufacturing process for a release film containing polyester according to an embodiment of the disclosure.

FIG. 2 is a schematic flow chart of a treatment process for a release film containing polyester after being used or a manufacturing process for a release film containing polyester according to an embodiment of the disclosure.

Step S11: a release agent is provided.

Step S12: a substrate containing polyester is provided.

Step S20: the release agent is formed on the substrate to manufacture a release film including the substrate and the release layer disposed thereon.

Step S30: the release film is used; and then, the used release film is recycled.

Step S40: the release layer on the substrate is removed by acid washing and/or alkali washing.

Step S51: a waste liquid after the acid washing and/or the alkali washing is collected.

Step S52: a solid matter after the acid washing and/or the alkali washing is subjected to a reproducing process for recycling polyester.

Additionally, the recycled and reproduced polyester (which may be referred to as a recycled-PET, r-PET) obtained or produced in step S52 could (but is not limited to) be used for the subsequent step S12.

Based on the above, a treatment method for the release film containing polyester of the disclosure may improve the recycling rate of polyester, and/or is simpler and/or more environmentally friendly.

INDUSTRIAL APPLICABILITY

By a method of the disclosure, polyester in the used release film could be recycled. Moreover, the recycled polyester could be reused. The reuse methods include, but are not limited to: manufacturing of a polyester-containing object such as textiles, containers, sheets, packaging materials, films, etc.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A disposal method for a polyester-containing release film, comprising:

providing a release film comprising a substrate and a release layer, wherein at least a material of the substrate comprises polyester;

performing an acid washing step to the release film for removing the release layer from the release film and obtaining a first solid matter containing polyester; and performing an alkali washing step to the first solid matter for obtaining a second solid matter containing polyester.

2. The disposal method for a polyester-containing release film according to claim 1, wherein the acid washing step comprises:

immersing the release film in an acid solution, wherein the acid solution comprises a mixture of dodecylbenzenesulfonic acid and paraffin oil at a weight ratio of 20:80 to 30:70.

3. The disposal method for a polyester-containing release film according to claim 1, wherein the alkali washing step comprises:

immersing the first solid matter in an alkali solution, wherein the alkali solution comprises a sodium hydroxide aqueous solution at a concentration of 7 wt % to 13 wt %.

4. The disposal method for a polyester-containing release film according to claim 3, wherein the alkali washing step further comprises:

heating the alkali solution to 50° C. to 70° C.

5. The disposal method for a polyester-containing release film according to claim 1, wherein the release layer is formed by an aqueous release agent.

6. The disposal method for a polyester-containing release film according to claim 5, wherein the aqueous release agent comprises hydrophilic silicone.

7. The disposal method for a polyester-containing release film according to claim 1 is a volatile organic solvent-free process.

* * * * *